(12) United States Patent
Klare et al.

(10) Patent No.: US 8,545,206 B2
(45) Date of Patent: Oct. 1, 2013

(54) DEVICE AND METHOD FOR THE GENERATIVE PRODUCTION OF THREE-DIMENSIONAL OBJECTS ON THE BASIS OF A MULTIPHASE SYSTEM

(75) Inventors: Martin Klare, Dortmund (DE); Frank Gischer, Menden (DE); Uwe Brick, Jena (DE)

(73) Assignee: DREVE ProDiMed GmbH, Unna (DE)

( * ) Notice: Subject to any disclaimer, the term of this patent is extended or adjusted under 35 U.S.C. 154(b) by 178 days.

(21) Appl. No.: 12/745,553

(22) PCT Filed: Feb. 12, 2009

(86) PCT No.: PCT/DE2009/000187
§ 371 (c)(1),
(2), (4) Date: Jun. 16, 2010

(87) PCT Pub. No.: WO2009/100712
PCT Pub. Date: Aug. 20, 2009

(65) Prior Publication Data
US 2010/0310698 A1    Dec. 9, 2010

(30) Foreign Application Priority Data
Feb. 13, 2008  (DE) .................. 10 2008 009 003

(51) Int. Cl.
*B29C 35/08*    (2006.01)

(52) U.S. Cl.
USPC ......... 425/174.4; 425/135; 425/145; 264/401

(58) Field of Classification Search
USPC ............. 425/135, 145, 174.4; 264/401
See application file for complete search history.

(56) References Cited

U.S. PATENT DOCUMENTS

| 4,575,330 A | 3/1986 | Hull |
| 5,247,180 A | 9/1993 | Mitcham et al. |
| 5,573,721 A * | 11/1996 | Gillette .................. 264/401 |
| 6,716,522 B2 | 4/2004 | Matsumoto |
| 7,128,866 B1 | 10/2006 | Henningsen |
| 2005/0248062 A1 | 11/2005 | Shkolnik et al. |

FOREIGN PATENT DOCUMENTS

| DE | 187 B | 8/1877 |
| DE | 9319405 U | 5/1994 |
| DE | 29911122 U | 11/1999 |
| WO | 01/00390 A | 1/2001 |

* cited by examiner

*Primary Examiner* — Robert J Grun
(74) *Attorney, Agent, or Firm* — Andrew Wilford

(57) ABSTRACT

The invention relates to a device and to a method for the production of a three-dimensional object by the consecutive layered bonding of a material that can be bonded by means of electromagnetic radiation, wherein in the so-called vat an at least n-phase system, where n>2, is present, of which at least one phase comprises the building material and at least one other a phase that cannot be mixed with the building material.

4 Claims, 2 Drawing Sheets

US 8,545,206 B2

DEVICE AND METHOD FOR THE GENERATIVE PRODUCTION OF THREE-DIMENSIONAL OBJECTS ON THE BASIS OF A MULTIPHASE SYSTEM

CROSS REFERENCE TO RELATED APPLICATIONS

This application is the US national phase of PCT application PCT/DE2009/000187, filed 12 Feb. 2009, published 20 Aug. 2009 as WO2009/100712, and claiming the priority of German patent application 102008009003.4 itself filed 13 Feb. 2008, whose entire disclosures are herewith incorporated by reference.

FIELD OF THE INVENTION

Described are an apparatus and a method for the production of a three-dimensional object by the consecutive layered solidification of a material that can be solidified by electromagnetic radiation, wherein a so-called vat holds an at least n-phase system with n≥2, of which at least one phase comprises the process material and at least one other a phase that cannot be mixed with the process material. Within the meaning of the invention, "not mixable" means that a defined phase boundary between at least two of the above-mentioned phases is formed. Preferably, the layer thickness of the one phases can be varied by a pump or can be controlled during the consumption of the phase that contains the process material.

Different methods for layered structuring of three-dimensional objects from "radiation-curable" photopolymers, are described in the literature, see "Generative Fertigungsverfahren" by A. Gebhardt 3. Aufl. 2007 (ISBN 978-3-446-22666-1). By continuous development of methods and materials, today, generative production methods are not used only for rapid production of prototypes (rapid prototyping), but increasingly in the field of rapid production (Klare, Martin; Altmann, Reiner: Rapid Production in der Hörgeräteindustrie in: RTejournal—Forum für Rapid Technologie, 2. Ausgabe, 2(2005), May 2005, ISSN 1614-0923, URN urn:nbn:de009-2-1049, http://www.rtejournal.de/aktuell/archiv/ausgabe2/104).

Also, in addition to their robustness, specific requirements apply here with respect to the economic efficiency of the used methods. The economic efficiency is, among other things, closely connected with the cost of the process materials and the necessary finishing processes. The present invention thus provides an apparatus and a method that, in comparison to the additive-layer production methods known from the prior art, has essential advantages in particular with respect to the cost-effective production of three-dimensional objects. For the generative production of three-dimensional objects from "radiation-curable" "photopolymers" today, primarily such methods are used that are based on light exposure by a laser (stereolithography, hereinafter designated as SLA), by a multi-media projector, a LC-display (reflexive, transmissive), LED or laser diode array (that is moved orthogonally to the array and across the layer), or by light valve technology (MEMS).

The methods are described in a number of patents such as: U.S. Pat. No. 4,575,330 by C. Hull "Apparatus for production of three-dimensional objects by stereolithography" and U.S. Pat. No. 4,999,143 by C. Hull et al "Methods and apparatus for production three-dimensional objects by stereolithography," in U.S. Pat. No. 5,247,180 A "Stereo-lithographic apparatus and method of use," Texas Instruments Inc., in U.S. Pat. No. 5,980,813 A "Rapid Prototyping using multiple materials," SRI International, and in DE G 9319405.6 "Vorrichtung zur Herstellung eines dreidimensionalen Objektes nach dem Prinzip der Photoverfestigung," Forschungszentrum Informatik an der Universität Karlsruhe. According to a similar method, in DE 29911122 U1 "Vorrichtung zum Herstellen eines 3-dimensionalen Objektes," the company Deltamed claims a use for the production of three-dimensional components. Furthermore, EP 1250995 [U.S. Pat. No. 6,716,522] "Vorrichtung zum Herstellen eines dreidimensionalen Objektes," owned by Envision Technologies, "Rapid-Prototyping-Vorrichtung and Rapid-Prototyping-Methode" DE 69909136 [U.S. Pat. No. 7,128,866] owned by DICON AS Lystrup, WO 2001/000390 owned by HAP, Sitec Industrietechnologie and Deltamed Medizinprodukte, and WO 2005/110722 [US 20050248062] owned by Envisiontec, are of relevance. The technical differences of the above-mentioned methods can substantially be characterized by the type of light exposure. In systems that use a laser for polymerization, the laser beam is moved across the cross-sectional area that has to be cured. The contours of the cross-sectional area to be cured can be scanned by the laser beam like a graph. This applies by way of example to the stereolithography system Viper Pro® from 3d Systems. In these systems, the process material in the form of a low-viscosity resin formulation is contained in a so-called vat. In commercially available variants, the vats can have a volume of up to 1.2 m³. The resin quantity necessary for the first filling of a vat, also designated as initial filling, represents a significant cost factor when purchasing such a system and accordingly, the consumables can account for up to 75% of the machine costs. Since the quantity of resin for the initial fill is independent of the quantities required for the components, the initial fill represents so-called "dead capital." From an economic point of view, this is an inhibiting factor and is a disadvantage, in particular with respect to rapid production processes. Moreover, over a longer period of time, such resin mixtures can change their chemical and physical values for example by scattered radiation of the used laser, mechanical or thermal load, contamination from the production environment, and for example by incompletely cured material on the surface of the components to be removed. In some cases, a so-called "creeping" of the vat, i.e. prepolymerization of the process material takes place. However, for the above-mentioned reasons, in this manner, the robustness of the process is significantly limited and either no components or components with undesired chemical and physical properties are obtained. Today, in rapid production processes on the basis of stereolithography, the "initial fill" is thus changed regularly to avoid a "creeping" of the resin, associated delays in the production process, and increased costs. In terms of robustness of the production process and economic efficiency, this is not desirable.

In contrast to systems on the basis of lasers, in systems based on mask projection such as, for example the Perfactory® series from Envisiontec or the V-Flash from 3d Systems, only complete layers are exposed to light at once. In case of the Perfactory, for example, a production platform is immersed from above into the vat, a defined distance between production platform and bottom is set, and subsequently, the light exposure is carried out through the bottom of the vat. Between component and the bottom of the vat, high adhesive forces occur that can result in the component breaking off the platform or the supporting structure. Therefore, after exposure to light, the vat is subsequently detached from the built layer by a tilting movement. With the so-called V-Flash method, by using the so-called FTI technology, the material is placed via a film underneath the production platform. Also in this case, a tilting movement of the production platform is carried out after the exposure to light. The tilting movement is necessary in both methods to minimize the peel strength between component and vat bottom or film. Despite this approach, it is necessary to use a massive supporting structure, so-called supports, to prevent the generated layer from detaching from the vat bottom. For the above-mentioned reason, the support structure must have a stronger bond with the component in comparison with the stereolithography. Consequently, it is more difficult to remove the support structure from the component after completion of the production job. Accordingly, a higher amount of rework is necessary. However, from an economic point of view, this is not desirable.

Moreover, the three-dimensional objects generated by the above-mentioned generative production methods must be cleaned after the production process and removal of the support structure with a solvent and subsequently finish-cured in a separate postexposure source. In terms of a cost-efficient total process, it is further desirable, if applicable, to eliminate these steps or to integrate them into the machine concept.

OBJECT OF THE INVENTION

It is the object of the present invention to provide an apparatus and a method for the production of three-dimensional objects by the consecutive layered solidification of a material that can be solidified by electromagnetic radiation where the disadvantages with respect to robustness and economic efficiency of the methods according to the prior art are minimized or non-existent.

SUMMARY OF THE INVENTION

This is achieved according to the invention in that in a vat holds an at least n-phase system with n≥2 of which at least one phase comprises the process material and at least one other a phase that cannot be mixed with the process material.

The apparatus and the method according to the invention allow one to reduce the required amount of process material in the generative production system to a minimum. Further, it is not necessary during the production process to separate an exposed layer from a substrate such as, for example, a vat bottom or a film. Thus, the above-mentioned adhesive forces can be avoided. Consequently, the apparatus and the method according to the invention result in a more robust generative production process that requires less rework and is ultimately more cost-efficient, and that can be used in particular preferably in the field of rapid prototyping.

DETAILED DESCRIPTION

Figure 1:
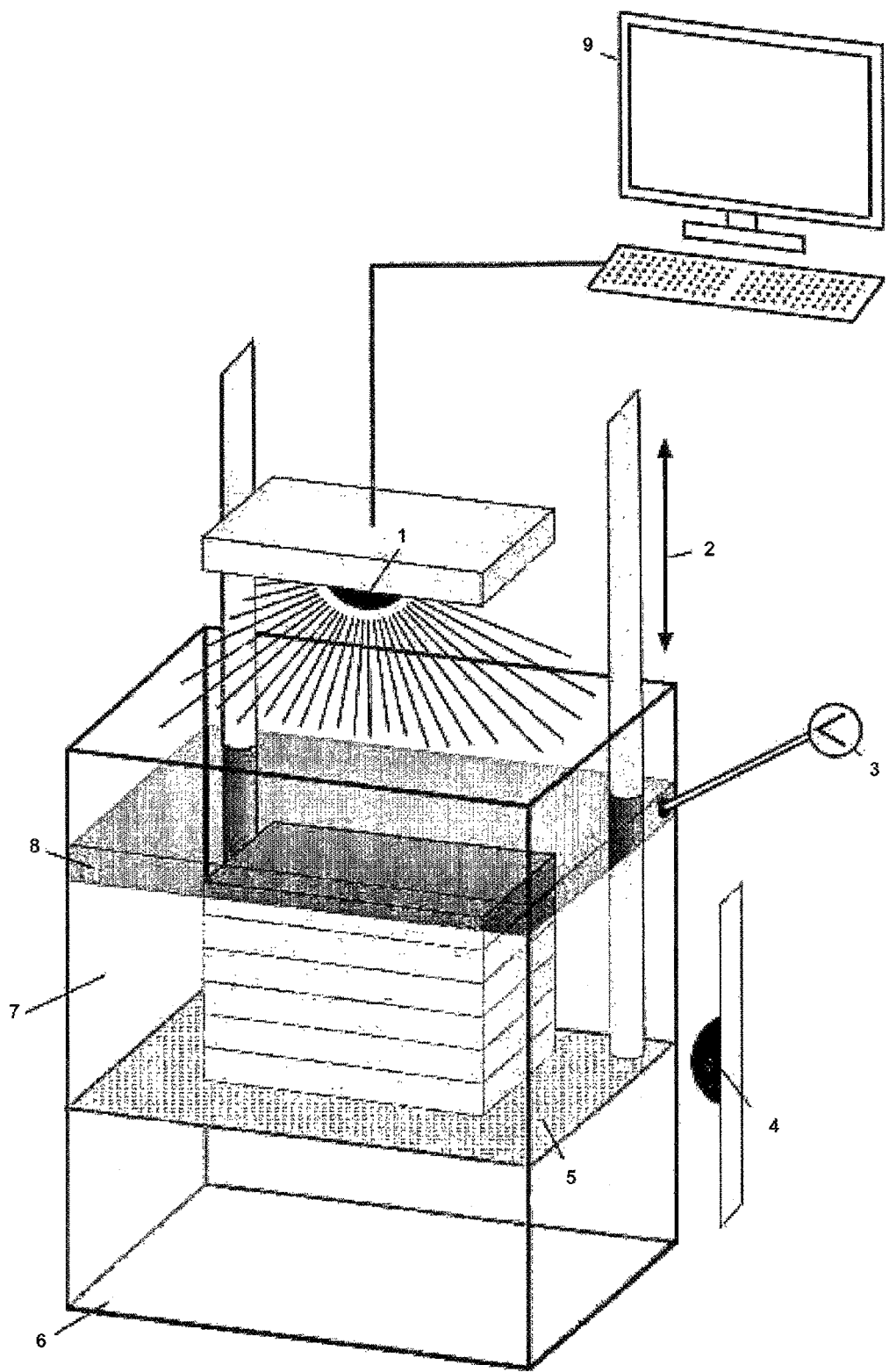
FIG. 1 is a schematic diagram illustrating the invention.

An embodiment according to the invention is illustrated in FIG. 1 for a two-phase system. The apparatus consists of a radiation source 1 that can be for example a laser or an image-projection system. Other energy supply sources within the meaning of the invention are explicitly not excluded. The production or build platform 5 is located on a movable holder 2 and, during the production process, can be moved within the vat 6 layer-by-layer and in a manner determined by a controller 9. The phase comprising the process material 8 can be dosed by a pump 3. It is possible here to add, during the production process, an excess of process material, that is, an amount of process material greater than the amount for one layer, or only the amount that is necessary for one layer. In a preferred embodiment, the process material can be pumped out after production so that the generated object is immersed in an auxiliary phase 7. In a particularly preferred embodiment, then, the object can be finish-cured by an appropriate radiation source 4. Compared to the prior art, this is to be considered as being very advantageous because by lowering the component into a phase that cannot be mixed with the process material, the excess process material is lifted from the component or the auxiliary phase into the process-material phase. Accordingly, in rapid production, a cleaning step for the components can thus be eliminated. Moreover, the generated component is cured in a phase without supplying oxygen. Thus, the curing is free of inhibitors. This is in particular of advantage for the production of medical products, the curing of which is based in most cases on a radical polymerization.

Figure 2:
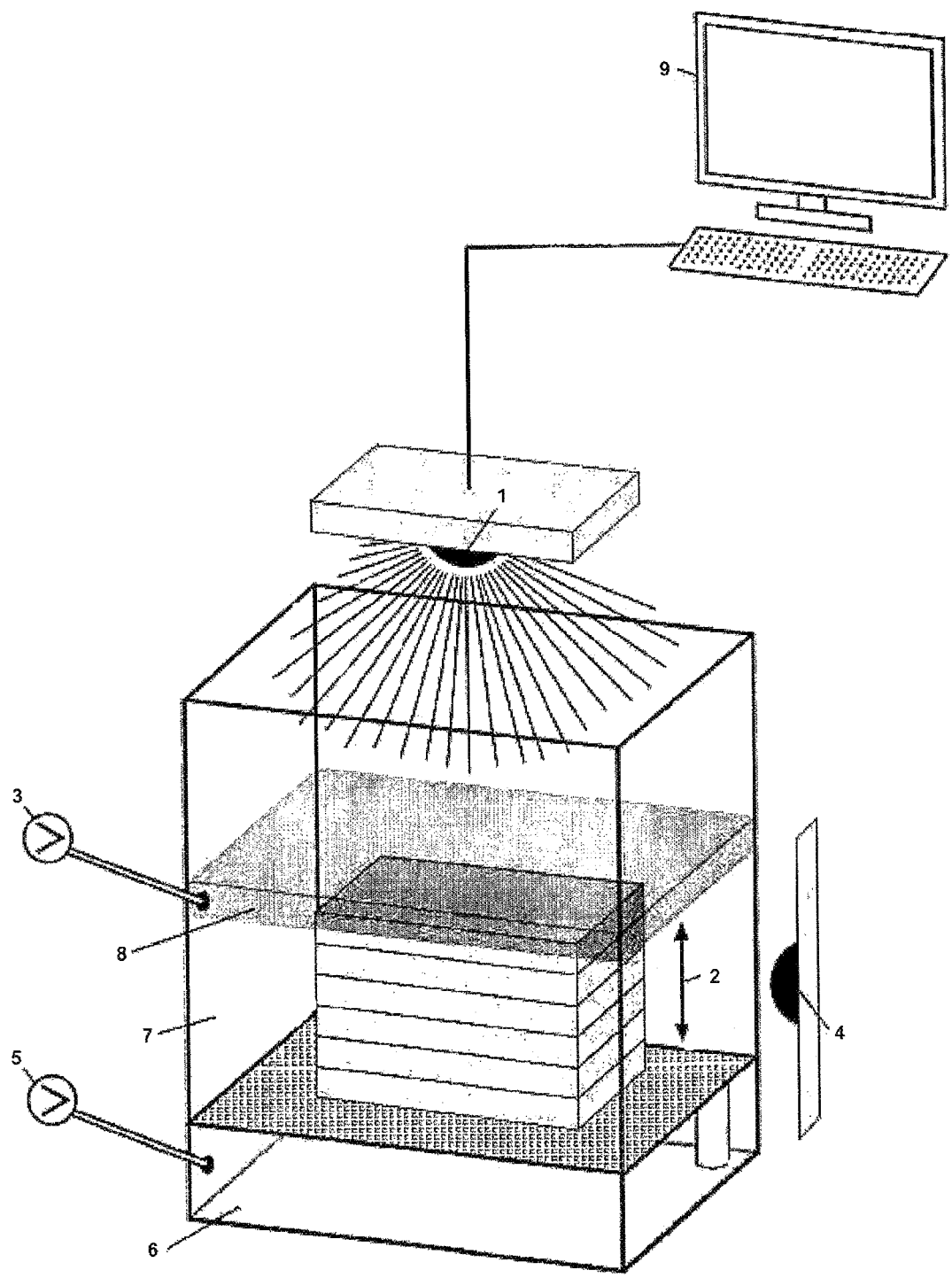
FIG. 2 is another schematic diagram of the invention.

A further embodiment according to the invention is illustrated in FIG. 2 for a two-phase system in which the process material phase 8 can be dosed with a pump 3 into the vat 4 and the auxiliary phase 7 with a pump 5. The apparatus comprises further a radiation source 1 that can be, for example a laser or an image projection system. Other energy supply sources within the meaning of the invention are explicitly not excluded.

Here, the production platform is fixed. During the production process, the controller 9 doses the liquid level with the pumps 3 and 5. For example, by adding the volume of one layer of auxiliary phase 7, a projection stratum of process material is provided that is elevated by one layer. By calculating the exposure parameter with respect to gain and focus, the next layer can then be polymerized by the radiation source 1. It is possible here to add, during the production process, an excess of process material, that is, an amount of process material greater than the amount for one layer, or only the amount that is necessary for one layer. In a preferred embodiment, the process material can be pumped out after production so that the generated object is in an auxiliary phase 7. In a particularly preferred embodiment, then, the object can be finish-cured by an appropriate radiation source 4. Compared to the prior art, this is to be considered as being very advantageous because by lowering the component into a phase that cannot be mixed with the process material, the excessive process material is transported from the component or the auxiliary phase into the process material phase. Accordingly, in rapid production, a cleaning step for the components can thus be eliminated. Moreover, the generated component is cured in a phase without oxygen supply. Thus, the curing is inhibition-free. This is in particular of advantage for the production of medical products, the curing of which is based in most cases on a radical polymerization.

Within the meaning of the invention, it is further not excluded for the embodiments that an active or passive coating system, as it is known to a person skilled in the art, is used.

Within the meaning of the invention, the term not mixable is to be understood as a practice-related interpretation. That is, between at least two phases, there is a zone of mixing ratios that results in the formation of a layering of two liquid phases.

Such an example for a two-phase system is shown in table 1.

TABLE 1

Example 1

| Components Process material phase | Components Auxiliary phase |
|---|---|
| 88.8% m/m (Octahydro-4,7-methano-1H-indenediyl)bis(methylene) diacrylate | 86% 1,2,3-propanetriol |
| 10% m/m TEGDMA, 2,2'-ethylenedioxydiethyl dimethacrylate | 14% $H_2O$ |
| 1% m/m camphorquinone | |
| 0.2% camphorquinone | |

Other systems with n≥2 phases are explicitly not excluded according to the invention.

In particular, the liquid phases can have different densities so that the phases can be layered on top of each other due to the density difference.

The invention claimed is:

1. An apparatus for making a three-dimensional object by the consecutive layered solidification of a process material that can be solidified by electromagnetic radiation within a predetermined spectral range, apparatus comprising: a vat holding a system with at least two layers of which at least one is composed of a phase that is the process material and another layer is composed of an auxiliary phase that cannot mix with the process material and that is transparent to electromagnetic radiation within the predetermined range; a pump for varying a thickness of at least one of the phases; means for irradiating the one layer with the electromagnetic radiation in the predetermined spectral range and thereby solidifying the one layer to generate a three-dimensional object; and means for irradiating the one layer through the other layer and thereby finish curing the object.

2. An apparatus for making a three-dimensional object by the consecutive layered solidification of a process material that can be solidified by electromagnetic radiation within a predetermined spectral range, the apparatus comprising:
a vat;
a build platform in the vat;
a lower layer of an auxiliary phase that cannot mix with the process material and that is transparent to electromagnetic radiation within the predetermined spectral range;
an upper layer of the process material;
pump means for adding the process material to and taking it away from the upper layer;
first means for radiating down into the vat and onto the upper layer electromagnetic radiation of the predetermined spectral range, whereby at least an uppermost stratum of the upper layer is solidified where impinged by the radiation;
means for lowering the platform or increasing a depth of the auxiliary phase such that succeeding strata of the upper layer can be solidified to create a three-dimensional object that is wholly immersed in the lower layer; and
second means for irradiating the three-dimensional object through the lower layer and thereby finish curing the three-dimensional object.

3. The apparatus defined in claim 2, wherein the second means for irradiating is below the upper layer.

4. The apparatus defined in claim 2, wherein the phase of the upper layer is less dense than the phase of the lower layer, whereby as the depth of the lower layer is increased or the platform is lowered the phase of the upper layer is lifted off the object at the interface of the upper and lower layer.

* * * * *